Feb. 25, 1958  W. A. EMERSON ET AL  2,824,729
VALVE SEAT HEATING DEVICE
Filed June 21, 1954

WITNESSES
Edwin E. Bassler
Robert L. Brabson

INVENTORS
William A. Emerson, Robert M. Baker
and Francis B. Jaworski
BY
F. E. Browder
ATTORNEY United States Patent Office 2,824,729
Patented Feb. 25, 1958

2,824,729

VALVE SEAT HEATING DEVICE

William A. Emerson, Baltimore, Robert M. Baker, Catonsville, and Francis B. Jaworski, Baltimore, Md., assignors to Westinghouse Electric Corporation, East Pittsburgh, Pa., a corporation of Pennsylvania Application June 21, 1954, Serial No. 438,066

9 Claims. (Cl. 266—4)

This invention relates to induction heating apparatus for the heat treatment of metallic workpieces, and, more particularly, to induction heating apparatus for heat treating the internal surfaces of cavities, such as valve seats or the like.

Due to the repeated impacts which the valves of an internal combustion engine impose on their associated valve seats, it is necessary that the surfaces of the latter bodies be heat treated. It is quite a problem to limit the high temperature required for surface hardening to only the surfaces of the valve seats, while also limiting the depth of penetration of the heat as desired. Prior art devices for obtaining this heat treating of surfaces in cavities, such as valve seats, have the disadvantage that the flux from the induction coil cannot be confined to the required limited area of the valve seat, and hence there is considerable loss of flux to areas surrounding the valve seat. Also, when coils of a few turns are inserted into cavities to heat surfaces therein, such as valve seats, the lead effects of the coils are an important consideration in the design of the coils, and result in coils that are quite expensive and difficult to build due to the close tolerances that must necessarily be employed in their construction.

One object of this invention, accordingly, is to provide an improved induction heating apparatus for heat treating the internal surfaces of metal cavities, such as valve seats, or the like.

It is another object of this invention to provide an induction heating apparatus for heating metal surfaces of cavities to very high temperatures while limiting the depth of heat penetration as desired.

It is a further object to provide an induction heating apparatus which improves the concentration of the flux from the inductor in a limited area on the surface of the workpiece to be heat treated.

It is an additional object to provide an induction heating apparatus having an improved system for the cooling of the inductor member.

It is a different object to provide an induction heating apparatus having an improved apparatus for the quenching of the surface of the workpiece.

It is still another object to provide an induction heating apparatus for the heat treating of the surfaces of metal cavities, such as valve seats or the like, that is rugged in construction and economical to manufacture.

In accordance with the invention, a core of a material which has a high value of magnetic permeability, but a relatively low value of electrical conductivity, such as powdered iron, or like material, is provided. This core may be considered as being divided into several portions. A helical coil is mounted on a first portion of the core. Another portion of the core is provided with a contour which enables the core to be inserted within a cavity of the workpiece whose surface it is desired to be heat treated. Also mounted on still another portion of the core, immediately adjacent to the portion of the core that is inserted within the workpiece, is a shading member. Power at suitable frequencies is supplied to the inductor coil to establish a flux which passes through the core. This flux remains in the core, since the core offers a lower reluctance path than air, until the flux approaches the end portion of the core which is inserted within the workpiece. However, the flux tends to scatter somewhat at the end portion of the core and this action would cause heating over a wide area. The shading member is employed to concentrate this flux in order to produce heating of the desired limited area on the surface of the workpiece with the desired very small depth of penetration of the heat.

These and other objects of the invention are effected as will be apparent from the following description, taken in accordance with the accompanying drawings which form a part of this application, and in which like numerals are employed to designate like parts throughout the same.

Figure 1:
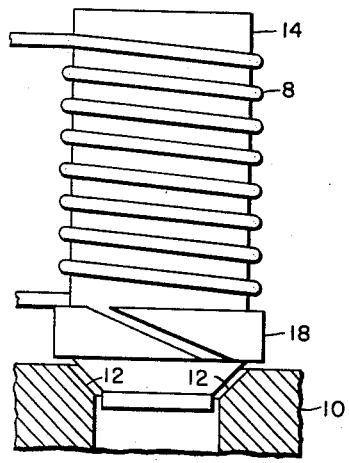
Figure 1 is a front view of induction heating apparatus in accordance with our invention.
Figure 2:
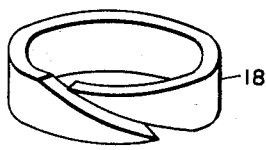
Fig. 2 is a perspective view of the split shading member used in the apparatus of Fig. 1.

Referring to the drawings in detail, in Fig. 1 there is shown a core 14 of a material that is highly permeable to magnetic flux, but which has a relatively low value of electrical conductivity, such as powdered iron or like material. This core 14 should be capable of passing large amounts of magnetic flux while limiting the magnitude of the induced eddy currents to prevent overheating of the core 14. Positioned on one portion of the core 14 and coaxial therewith is a simple helical coil 8, preferably having a plurality of turns. Another portion of the core 14 is provided with a contour which enables it to be positioned adjacent to the workpiece 10 whose surface 12 is to be heat treated. In this figure and in other figures where shown, the workpiece 10 is shown in a sectional view in order that the positioning of the core 14 with respect to the workpiece 10 may be illustrated with clarity. A shading member 18, which is, in effect, impermeable to magnetic flux, is positioned on the core 14 between the coil 8 and the portion of the core 14 that is adjacent to the workpiece 10 whose surface 12 is to be heat treated. The shading members, in accordance with our invention, may be of any non-magnetic conducting material, such as copper or silver, but it should be noted that the higher the resistivity of the metal the greater will be the power losses in the shading member. This shading member 18 is shown in the form of a ring member, but it should be realized that the shading member could take other forms without departing from the scope of this invention. The shading member 18 is split in order to prevent large losses of power therein. Fig. 2 illustrates more clearly the split shading member 18 utilized in the apparatus shown in Fig. 1. This shading member 18 may be made of copper or any other like material.

Figure 3:
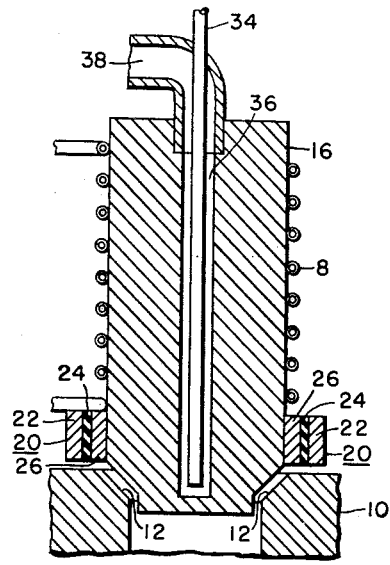
Fig. 3 is a longitudinal sectional view of an induction heating apparatus employing a modification of our invention in which a cooling system is provided for cooling the core while the workpiece is being heat treated.

In Fig. 3, there is shown an induction heating apparatus that consists of the combination of the members shown in Fig. 1 with the modification, in accordance with our invention, in which a modified core 16 is provided having a channeled section 36, and in which apparatus a modified shading member 20 is utilized. The channeled section 36 provides a cooling system for the cooling of the core 16 to prevent excessive heating of the core while the workpiece is being heated. This cooling system comprises a passage for a cooling medium within the core 16, and consists of a channeled section 36 within the core 16, a connecting member 38 attached to the channeled section, and a conduit 34 inserted within the channeled section. Both the connecting member 38 and the conduit 34 may be connected to an external supply of the cooling medium. It should be understood that a cooling system could consist of a single channeled section in the core having two end portions, with the cooling medium entering at one end portion and exiting at the other end portion. In the cooling system shown in Fig. 3, the water enters and leaves the core 16 at the same portion or end of the core 16. It is believed that this is the more desirable system, since the cooling medium is quite remote from the workpiece 10 and less heat is lost from the from the workpiece 10 and less heat is lost from the workpiece by convection, as would be the case if the cooling medium passed near the workpiece. It can also be seen that the cooling system allows for greater mobility of the core 16 when it is positioned adjacent to the workpiece 10, which is quite a factor if the induction apparatus is employed in an assembly line.

Figure 4:
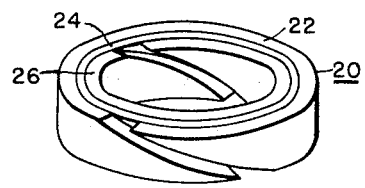
Fig. 4 is a perspective view of the modified shading member used in the apparatus of Fig. 3 in accordance with our invention.

In Fig. 4 is shown the modified shading member of the apparatus shown in Fig. 3 in accordance with our invention. The modified shading member 20, which is also impermeable to magnetic flux, consists of a plurality of layers of non-magnetic conductive material, such as copper and the like, with each of the conductive layers separated by a layer of insulating material.

In this particular embodiment, the conductive layers are 22 and 26. Each of the conductive layers 22 and 26 are separated from adjacent layers by means of an insulating layer 24. Each of the conductive layers 22 and 26 are split so that they do not form a closed electrical path of any appreciable length for induced currents therein.

The laminating of the modified shading member 20 and the splitting of the conductive layers 22 and 26 as shown reduce the power losses in the modified shading member 20.

Figure 5:
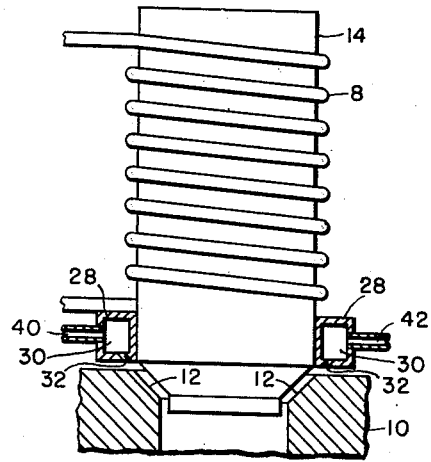
Fig. 5 is a front view of an induction heating apparatus employing a modification of our invention in which the shading member is provided with a channeled section and a plurality of orifices to provide a passage for a cooling medium for the quenching of the workpiece.
Figure 6:
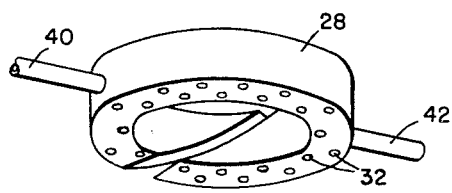
Fig. 6 is a perspective view of the shading member used in the apparatus shown in Fig. 5.

In Fig. 5, there is shown an induction heating apparatus that consists of the combination of the members shown in Fig. 1 with the modification, in accordance with our invention, that a further modified shading member 28 is provided in Fig. 5. This further modified shading member 28 is positioned on the core 14 between the coil 8 and the portion of the core which is adjacent to the workpiece 10. In Fig. 6 is shown the latter further modified shading member 28 per se with a channeled section 30 provided therein, to provide a passage for a cooling medium which may be used for quenching the workpiece 10 after it has been heated. Two connecting conduits 40 and 42 are provided as connectors between the channeled section 30 of the shading member 28 and the supply of the cooling medium.

On the surface of the shading member 28 that is adjacent to the workpiece 10, a plurality of orifices 32 are provided so that the cooling medium may flow from the channeled section 30 of the further modified shading ring 28 through the orifices 32 and onto the workpiece 10. This further modified shading ring 28 is split as in the previous two types of shading members 18 and 20, and its walls may be in the form wholly of a solid non-magnetic conductive material, such as copper or the like, or laminated as the type shown in Fig. 4.

In accordance with our invention, as shown in Fig. 1, a portion of the core is placed adjacent to the workpiece to be heat treated. For example, from laboratory experimentation, it was found that a spacing of no more than 1/16" between the shading member 18 and the surface 12 is needed to obtain heating in the desired area. Power at suitable high frequencies is applied to the coil 8 which causes flux to pass through the core 14. The flux is then concentrated as it passes from the end portion of the core 14 adjacent to the workpiece 10 by the action of the shading member 18. Numerous local currents are set up in the shading member 18. Each of these currents sets up a flux field to oppose the flux that would otherwise leave the surface of the core from the area that is now covered by the shading member. Hence, the flux thereof is concentrated and compelled to leave the core 14 at the portion of the core that is adjacent to the workpiece 10. This is the basic principle on which shading member 18 and all its modifications operate in accordance with our invention. This concentrated flux passes through the workpiece 10 over a limited area on the surface 12 of the workpiece and induces eddy currents therein. These currents produce heating to a high temperature of the workpiece 10 over the limited area, and effectively only the surface 12 of the workpiece 10 is penetrated to a very small depth by the heat produced due to the skin effect realized from the induced currents at the high frequencies.

The heating apparatus shown in Fig. 3 operates basically the same as the heating apparatus described above. However, in the modification shown in Fig. 3, a cooling system is provided for the cooling of the core 16. There will be some heating of the core when it passes flux produced at high current densities for extended periods of time. When the cooling system is placed in operation, the cooling medium flows through the conduit 34 and empties into the bottom of the channeled section 36 of the core 16. It then rises up through the channeled section 36 of the core 16 and empties through the connector 38. The flow of the cooling medium up through the channeled section 36 of the core 16 cools the core. The cooling medium can be caused to flow continuously during the heating of the workpiece 10 or only when the high temperature of the core 16 requires the use of the cooling medium.

The heating apparatus shown in Fig. 5 operates basically in the same manner as the heating apparatus shown in Fig. 1. However, in the modification shown in Fig. 5, the cooling medium is supplied to the further modified shading member 28 through the two connecting conduits 40 and 42 and flows through the channeled section 30 of the shading member 28. The flow of the cooling medium is preferably started after the workpiece 10 has been heated and is ready to be quenched. The cooling medium is allowed to flow through the channeled section 30 of the shading member 28 and out through the orifices 32 onto the surface 12 of the workpiece 10 for the quenching of the heated surface 12 of the latter body. The passing of the cooling medium for quenching through the shading member 28 will also have the desirable effect that it will aid in cooling the core 14 during the quench cycle before it is positioned for heat-treating the next workpiece. This effect will be quite useful in the heat treating of workpieces on a mass production basis.

While we have shown our invention in particularly one embodiment with several modifications, it will be obvious to those skilled in the art that it is not so limited, but is susceptible of various changes and modifications without departing from the spirit thereof.

We claim as our invention:

1. In apparatus for heat treating a surface of a workpiece, the combination of a core, said core having an end portion, a high frequency induction coil, said coil being positioned on said core to induce a high frequency magnetic flux therein, said end portion of the core being adapted for positioning adjacent to said workpiece, and a shading member, said shading member being positioned on said core between said end portion of the core and said coil and surrounding said core so as to cause substantially all of said flux to traverse said end portion.

2. In apparatus for heat treating a surface of a workpiece, the combination of a core having at least first, second and third positions, a high frequency inductor coil, said coil being positioned on the first portion of said core to induce a high frequency flux therein, and a shading member, said shading member being positioned on the second portion of said core, with the third portion of said core being adapted to be positioned adjacent to the workpiece during the heat treatment of said workpiece, and with said shading member being operative to concentrate said flux substantially within said third portion of said core.

3. In apparatus for heat treating a surface of a workpiece, the combination of a non-conducting, magnetically permeable core having at least first, second and third portions, a high frequency inductor coil, said coil being positioned on the first portion of said core and coaxial therewith to provide a magnetic flux path axially thereof, the third portion of said core being adapted for positioning adjacent to the surface of said workpiece to be heat treated, and a shading member, with said shading member being substantially impermeable to magnetic flux and surrounding the second portion of said core so as to encircle said flux path to cause substantially all the magnetic flux to traverse the surface of said workpiece adjoining said third portion of said core.

4. In apparatus for heat treating a surface of a workpiece, which apparatus is adapted to be cooled by a cooling medium, the combination of a powdered iron core having at least first and second portions and having a channeled section within said core, a conduit provided within said channeled section for the flow of said cooling medium, such that the cooling medium flows within said core in one direction through said conduit and continues to flow within said core in the opposite direction through said channeled section so that a continuous flow of the cooling medium is provided within said core, with the cooling medium flowing into and out of the core at the first portion of said core, an inductor coil, said coil being positioned adjacent to the first portion of said core and coaxially therewith, with said second portion of the core being adapted for positioning adjacent to a surface of said workpiece to be heat treated, and a shading member, with said shading member being substantially impermeable to magnetic flux and being positioned on said core between the second portion of said core and said coil.

5. In apparatus for heat treating a surface of a workpiece, which apparatus is adapted to be cooled by a cooling medium, the combination of a powdered iron core having at least first and second portions and having a channeled section within said core, said cooling medium provided to flow through said channeled section for the cooling of said core, an inductor coil, said coil being positioned on the first portion of said core and coaxial with said core, said second portion of the core being positioned adjacent to said surface of the workpiece, a shading member being substantially impermeable to magnetic flux and consisting of a plurality of layers of nonmagnetic conductive material, with each of said layers being separated from adjacent conductive layers by layers of electrically non-conducting material, said shading member being positioned on said core between the first and second portions of said core.

6. In apparatus for heat treating a workpiece, which apparatus is provided with a cooling medium for quenching the workpiece, the combination of a non-conducting, magnetically permeable core having at least first, second and third portions, an inductor coil, said coil being positioned on the first portion of said core and coaxial therewith, the third portion of said core being adapted for positioning adjacent to said workpiece to be heat treated, a shading member, said shading member being substantially impermeable to magnetic flux and having a channeled section within said shading member and having a plurality of orifices whereby said cooling medium flows through said channeled section and out through said orifices to quench said workpiece, with said shading member being positioned on the second portion of said core.

7. Apparatus for induction heating the inner peripheral edge of an aperture comprising, in combination, a magnetic core member provided with a main body portion having a predetermined cross-sectional area, a reduced cross-sectional area portion in said core member at one end of the main body portion, said latter-mentioned portion being of a size to permit its insertion into said aperture, an induction coil surrounding the main body portion, and a magnetic shading member surrounding the outer periphery of said main body portion adjacent said reduced cross-sectional area portion whereby magnetic lines of flux induced in the main body portion will be concentrated on said inner peripheral edge when the reduced cross-sectional area portion extends into said aperture.

8. Apparatus for induction heating the inner peripheral edge of an aperture comprising, in combination, a magnetic core member provided with a main body portion having a cross-sectional area substantially equal to or greater than the cross-sectional area of said aperture, a reduced cross-sectional area portion in said core member at one end of the main body portion, said reduced cross-sectional area being less than the cross-sectional area of said aperture whereby the smaller body portion may extend into said aperture, an induction coil surrounding the main body portion, and a split magnetic shading member entirely surrounding the outer periphery of said main body portion immediately adjacent said reduced cross-sectional area portion whereby magnetic lines of flux in the main body portion will be concentrated on said inner peripheral edge when the reduced cross-sectional area portion extends into said aperture.

9. Apparatus for induction heating the inner peripheral edge of a circular opening comprising, in combination, a magnetic core member having a main cylindrical body portion, a tapered portion in said core member at one end of the main body portion for insertion into said opening, said tapered portion being concentric with the main body portion, an induction coil surrounding the main body portion, and a magnetic shading member entirely surrounding said main body portion adjacent said tapered portion whereby magnetic lines of flux induced in the main body portion will be concentrated on said inner peripheral edge when the tapered portion is inserted into said opening.

References Cited in the file of this patent

UNITED STATES PATENTS

| | | |
|---|---|---|
| 2,162,465 | Van Guilder | June 13, 1939 |
| 2,448,690 | Storm | Sept. 7, 1948 |
| 2,539,547 | Mossman et al. | Jan. 30, 1951 |
| 2,615,119 | Riegel | Oct. 21, 1952 |
| 2,628,104 | Shardlow | Feb. 10, 1953 |
| 2,687,464 | Crawford | Aug. 24, 1954 |

FOREIGN PATENTS

| | | |
|---|---|---|
| 275,887 | Switzerland | Sept. 1, 1951 |